(12) United States Patent
Edpalm et al.

(10) Patent No.: US 12,342,022 B2
(45) Date of Patent: Jun. 24, 2025

(54) VIDEO FAILOVER RECORDING

(71) Applicant: Axis AB, Lund (SE)

(72) Inventors: Viktor Edpalm, Lund (SE); Jonas Cremon, Lund (SE)

(73) Assignee: AXIS AB, Lund (SE)

( * ) Notice: Subject to any disclaimer, the term of this patent is extended or adjusted under 35 U.S.C. 154(b) by 55 days.

(21) Appl. No.: 18/530,479

(22) Filed: Dec. 6, 2023

(65) Prior Publication Data

US 2024/0196035 A1    Jun. 13, 2024

(30) Foreign Application Priority Data

Dec. 7, 2022    (EP) .................................... 22212005

(51) Int. Cl.
*H04N 21/2662*    (2011.01)
*H04N 21/2365*    (2011.01)
(Continued)

(52) U.S. Cl.
CPC ... *H04N 21/2662* (2013.01); *H04N 21/23655* (2013.01); *H04N 21/44004* (2013.01); *H04N 19/436* (2014.11)

(58) Field of Classification Search
CPC ............. H04L 41/0663; H04L 43/0876; H04L 65/1059; H04L 65/752; H04L 65/80; H04L 69/40; H04N 19/436; H04N 21/234327; H04N 21/234381; H04N 21/23655; H04N 21/24; H04N 21/2402; H04N 21/2662; H04N 21/44004; H04N 21/60; H04N 21/64792; H04N 7/183
See application file for complete search history.

(56) References Cited

U.S. PATENT DOCUMENTS 6,711,126 B1 * 3/2004 Besset-Bathias ........................... H04Q 11/0478
370/428
9,307,217 B1    4/2016 Day
(Continued)

FOREIGN PATENT DOCUMENTS

EP    3742739 A1    11/2020

OTHER PUBLICATIONS

European Search Report issued on May 25, 2023 for European Patent Application No. 22212005.7.
(Continued)

*Primary Examiner* — Peter D Le
(74) *Attorney, Agent, or Firm* — Volpe Koenig (57) ABSTRACT

A method of failover recording of video streams in a camera connectable to a receiver device over a communication network, the method comprising: detecting that a bandwidth of a connection over the communication network is insufficient for transmitting a video stream at a predetermined bitrate, generating multiple parallel encoded video streams with different bitrates, storing the multiple parallel encoded video streams on a memory storage accessible to the camera, detecting that the memory storage usage of the memory storage exceeds a storage threshold, discontinuing the storing of one of the multiple encoded video streams being the encoded video stream that provides the highest bitrate among the multiple encoded video streams, and discarding the one of the multiple encoded video streams from the memory storage.

9 Claims, 4 Drawing Sheets

(51) Int. Cl.
*H04N 21/44* (2011.01)
*H04N 19/436* (2014.01)

(56) References Cited

U.S. PATENT DOCUMENTS

| | | | | |
|---|---|---|---|---|
| 10,003,830 | B1* | 6/2018 | Morgos | H04N 21/23103 |
| 10,271,079 | B1* | 4/2019 | Woschank | H04N 21/4788 |
| 10,349,059 | B1* | 7/2019 | Good | H04N 19/115 |
| 10,687,028 | B2* | 6/2020 | Siann | H04N 23/00 |
| 10,728,299 | B2* | 7/2020 | Barker | H04N 21/6582 |
| 10,728,438 | B1 | 7/2020 | Smith et al. | |
| 10,958,947 | B1* | 3/2021 | Wei | H04N 21/236 |
| 11,501,791 | B1* | 11/2022 | Briggs | H04L 65/80 |
| 2002/0067768 | A1 | 6/2002 | Hurst | |
| 2004/0031054 | A1* | 2/2004 | Dankworth | H04L 65/70 |
| | | | | 725/86 |
| 2004/0117427 | A1* | 6/2004 | Allen | H04N 21/6543 |
| | | | | 709/200 |
| 2007/0123280 | A1* | 5/2007 | McGary | H04M 3/4931 |
| | | | | 455/466 |
| 2007/0273762 | A1 | 11/2007 | Steensma et al. | |
| 2008/0186988 | A1* | 8/2008 | Carmon | H04L 47/34 |
| | | | | 370/412 |
| 2010/0149308 | A1* | 6/2010 | Mihara | H04N 21/42203 |
| | | | | 375/E7.076 |
| 2010/0211843 | A1* | 8/2010 | Dacosta | H04L 1/0014 |
| | | | | 714/E11.131 |
| 2011/0022705 | A1* | 1/2011 | Yellamraju | H04L 65/756 |
| | | | | 709/227 |
| 2011/0050913 | A1 | 3/2011 | Kim | |
| 2012/0179742 | A1* | 7/2012 | Acharya | H04N 21/23116 |
| | | | | 709/202 |
| 2012/0198506 | A1* | 8/2012 | Joe | H04N 21/6371 |
| | | | | 725/97 |
| 2012/0250762 | A1* | 10/2012 | Kaye | H04L 65/752 |
| | | | | 375/240.07 |
| 2013/0097309 | A1 | 4/2013 | Ma et al. | |
| 2013/0219073 | A1* | 8/2013 | Dong | H04L 65/612 |
| | | | | 709/231 |
| 2013/0336627 | A1 | 12/2013 | Calvert | |
| 2017/0078890 | A1* | 3/2017 | Zhu | H04W 8/08 |
| 2017/0111295 | A1* | 4/2017 | Snowdon | G06F 13/4022 |
| 2017/0171264 | A1* | 6/2017 | Salomons | H04N 21/2662 |
| 2017/0195385 | A1* | 7/2017 | Wang | H04W 36/0027 |
| 2018/0007362 | A1 | 1/2018 | Krishnan | |
| 2018/0070134 | A1 | 3/2018 | Kouncar | |
| 2018/0091217 | A1* | 3/2018 | Christomanos | H04W 8/04 |
| 2018/0184142 | A1 | 6/2018 | Schmidt | |
| 2018/0276961 | A1 | 9/2018 | Roth et al. | |
| 2019/0141292 | A1* | 5/2019 | Thakkar | H04L 12/1818 |
| 2019/0261007 | A1 | 8/2019 | Emmanuel et al. | |
| 2019/0268797 | A1* | 8/2019 | Pang | H04L 47/125 |
| 2020/0033923 | A1* | 1/2020 | Koeninger | H04L 43/0811 |
| 2020/0053142 | A1* | 2/2020 | Holden | H04N 21/2402 |
| 2020/0186575 | A1* | 6/2020 | Rofe | H04L 7/0041 |
| 2020/0404389 | A1* | 12/2020 | Cheng | H04N 21/43637 |
| 2022/0191572 | A1* | 6/2022 | Katrib | H04N 21/2404 |
| 2022/0345762 | A1 | 10/2022 | Frishman et al. | |
| 2023/0155951 | A1* | 5/2023 | Robertson | H04W 28/0268 |
| | | | | 370/412 |
| 2024/0177740 | A1* | 5/2024 | Danielson | H04L 12/1827 |
| 2024/0179357 | A1* | 5/2024 | Björkman | H04N 21/4788 |
| 2025/0054518 | A1* | 2/2025 | Björkman | H04N 21/23418 |

OTHER PUBLICATIONS

Communication pursuant to Article 94(3) EPC dated Oct. 2, 2024 for European Patent Application No. 22 212 1 005.7.

* cited by examiner

VIDEO FAILOVER RECORDING

TECHNICAL FIELD

The present invention generally relates to the field of camera surveillance, and in particular to a method for failover recording of video streams. The present invention further relates to a corresponding control unit, a camera, and a computer program.

BACKGROUND

In various camera surveillance applications, the camera captures and encodes a video stream and transmits the encoded video stream over a communication network with a given bandwidth to a server or otherwise remote storage. The encoded video stream is typically pushed continuously over the communication network for storage or to an interface so that a user can observe the captured video stream in near real-time from a location remote from the camera location.

However, if the connection across the communication network is lost, or the bandwidth is temporarily substantially reduced, the camera is unable to push the video stream, encoded at some bitrate, across the network.

A solution to a lost connection is to buffer the encoded video stream locally at the camera. Once the connection is restored, the buffered video stream is transmitted across the communication network. However, this requires a local storage at the camera and this type of storages, typically an SD card or RAM, have limited capacity.

Accordingly, there is room for improvements with regards to handling produced video data in a camera when a connection over its communication network is lost or substantially reduced.

SUMMARY

In view of above-mentioned and other drawbacks of the prior art, it is an object of the present invention to provide an improved method of failover recording of video streams in a camera that alleviates at least some of the drawbacks of prior art.

According to a first aspect of the present invention, it is therefore provided a method of failover recording of video streams in a camera connectable to a receiver device over a communication network, the method comprising: detecting that a bandwidth of a connection over the communication network is insufficient for transmitting a video stream at a predetermined bitrate, generating multiple parallel encoded video streams with different bitrates, storing the multiple parallel encoded video streams on a memory storage accessible to the camera, detecting that the memory storage usage of the memory storage exceeds a storage threshold, discontinuing the storing of one of the multiple encoded video streams being the encoded video stream that provides the highest bitrate among the multiple encoded video streams, and discarding the one of the multiple encoded video streams from the memory storage.

The present invention is based upon the realization that by storing encoded video streams with reduced bitrates, it is possible to buffer video of longer time periods so that a recording for the time duration of a lost or reduced connection can anyway be transmitted once the connection is restored. More specifically, the inventors realized to generate and store multiple parallel video streams with different bitrates. Once the memory storage is full, or close to full according to a storage threshold, one, or more, of the parallel video streams is discontinued and no longer stored, and subsequently discarded from the memory storage device, which provides free storage space on the memory storage device to continue storing the other video streams. Thus, even if the memory storage device has a limited storage capacity, failover video can anyway be stored over relatively extensive time durations of lost connections.

Video streams may be viewable in their own, or in some implementations, need to be combined with another video stream where the combination is viewable. In case of video streams that are viewable in their own, it is a video stream in its own that provides the highest bit rate.

Another possible implementation is that the video stream is a video stream that needs to be combined with another one or more of the video streams to form a complete viewable video stream, where it is the combination that provides the highest bitrate. In this case, it is a video stream that needs to be combined, that is discarded.

A video stream is generally a set of consecutive image frames captured over time. The consecutive image frames collectively form the video stream.

That the memory storage device is accessible to the camera may be that the memory storage device is an internal memory of the camera, such as a non-volatile flash memory like a secure digital (SD) card. A further possible internal memory is a random-access memory (RAM). However, the memory storage may in other developments be external to the camera but at the location near the camera, for example connected via data transfer cables such as USB or network cables or similar.

The bandwidth of the communication network may be defined as the present capacity in bits per unit time that the communication network can transmit. If the present capacity of the bandwidth is less than the bitrate of the presently produced encoded video stream, the bandwidth of the communication network is insufficient to transmit the video stream.

A bitrate is the number of bits per unit time that is being generated from the image frames of the video stream captured by the camera. The bits may be generated in an encoder which encodes the captured image frames according to an encoding protocol such as MP4. The bitrate is directly or indirectly indicative of the produced bits per unit time.

According to an embodiment, the method may comprise detecting that the communication network is restored, and transmitting, over the communication network, one or more of the multiple parallel encoded video streams. Advantageously, the transmission is resumed once the connection across the communication network is restored, and a preferred one or more of the stored encoded video streams is transmitted. Preferably, the video stream that provides the highest quality or resolution is transmitted. This is generally the single video stream or combination of video streams that result in the highest bitrate.

According to an embodiment, the method may comprise detecting that the communication network is restored, determining a present bandwidth of the restored communication link, and transmitting one or more of the still stored bitrate video streams that combined does not exceed the present bandwidth of the restored communication link. Preferably, the one or more video streams that are transmitted maximizes the bandwidth utilization of the communication link.

According to an embodiment, the multiple parallel encoded video streams are generated with decreasing interstream bitrates. Thus, bitrates of the encoded video streams are encoded with bitrates where a first bitrate is larger than a second bitrate which is larger than a third bitrate, and so on. The decrease in bitrate may for example be a scaling in bitrate.

In one possible embodiment, the decrease in bitrate may be a scaling by half between the parallel video streams.

According to an embodiment, discontinuing the storing may be to discontinue the storing the presently highest bitrate video stream, and wherein the presently highest bitrate video stream is discarded. This advantageously releases the most capacity on the memory storage.

According to an embodiment, the multiple parallel encoded video streams may be encoded with different image resolutions or frame rate or degree of compression. Generally, any one or all of varying the image resolutions or the frame rate or the compression will affect the bitrate.

According to an embodiment, the multiple parallel encoded video streams may comprise a base encoded video stream and a set of enhancement encoded video streams combinable with the base encoded video stream to form a higher resolution video stream than the base encoded video stream alone. The encoded video stream may be low resolution video stream that is complete in itself for transmission and display. One or more enhancement video streams are combined with the base encoded video stream to provide a higher resolution video stream. The enhancement video streams cannot generate a valid video by itself but must be combined with the base encoded video stream.

According to an embodiment, discontinuing the storing may be to discontinue the storing of one or more of the enhancement encoded video streams, and wherein the one or more of the enhancement encoded video streams is discarded. Thus, in this way the video stream that provides the highest bitrate, when combined with the base encoded video stream, is discarded to leave free storage for continuing storing the other enhancement encoded video streams and the base encoded video stream.

In embodiments, the memory storage threshold may be that the memory storage is full. Thus, once the memory storage indicates that it has reached its full capacity, discontinuing storing and discarding of a video stream is executed.

The multiple parallel encoded video streams are generated for the same scene.

The number of parallel video streams may be select based on a present implementation at hand but is preferably at least two. In possible implementations, the number of parallel video streams is five or more, or about eight to ten.

According to a second aspect of the present invention, there is provided a control unit arranged to perform the method of the first aspect and embodiments thereof.

Further embodiments of, and effects obtained through this second aspect of the present invention are largely analogous to those described above for the first aspect of the invention.

According to a third aspect of the present invention, there is provided a camera comprising a memory storage for storing encoded video streams and an input/output interface to communicate with a receiver device over a communication network, and a control unit according to the second aspect.

The camera may be a surveillance network camera.

Further embodiments of, and effects obtained through this third aspect of the present invention are largely analogous to those described above for the first aspect and the second aspect of the invention.

According to a fourth aspect of the present invention, there is provided a computer program product comprising program code for performing, when executed by a control unit, the method of any of the herein discussed embodiments.

Further embodiments of, and effects obtained through this fourth aspect of the present invention are largely analogous to those described above for the other aspects of the invention.

Further features of, and advantages with, the present invention will become apparent when studying the appended claims and the following description. The skilled addressee realize that different features of the present invention may be combined to create embodiments other than those described in the following, without departing from the scope of the present invention.

BRIEF DESCRIPTION OF THE DRAWINGS

The various aspects of the invention, including its particular features and advantages, will be readily understood from the following detailed description and the accompanying drawings, in which.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person. Like reference characters refer to like elements throughout.

Figure 1:
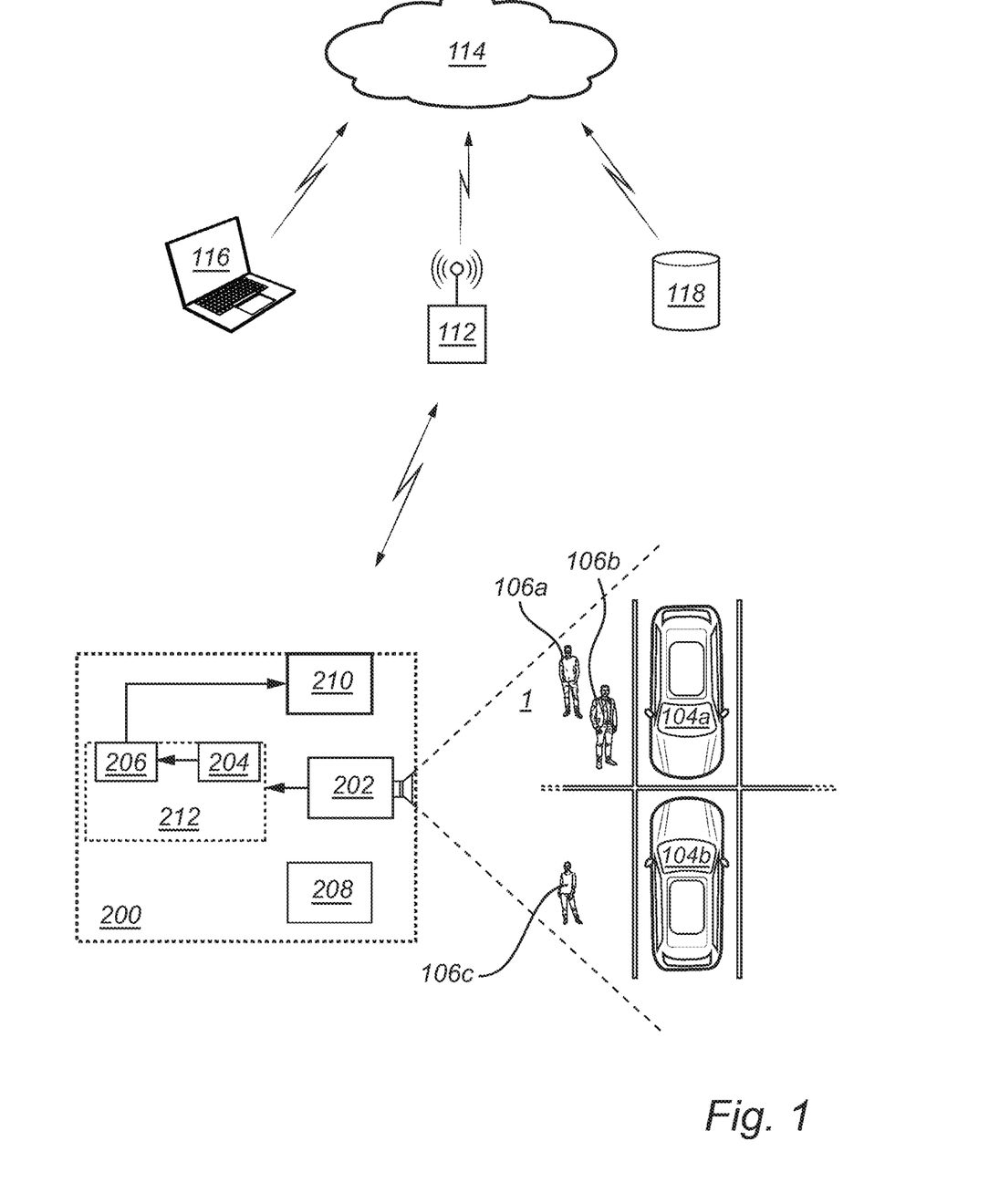
FIG. 1 conceptually illustrates an example application of embodiments of the invention.

Turning now to the drawings and to FIG. 1 in particular, there is shown a scene 1 being monitored by an image acquisition device 200, e.g., a network camera or more specifically a network surveillance camera. In the scene 1, there is a set of objects 104a, 104b, that may be for example vehicles in a parking lot, and persons 106a-c.

The camera 200 may be mounted on a building, on a pole, or in any other suitable position depending on the specific application at hand. Further the camera 200 may be a fixed camera or a movable camera such as pan, tilt and zoom, or even a body worn camera. Further, the camera 200 may be a visible light camera, an infrared (IR) sensitive camera or a thermal (long-wavelength infrared (LWIR)) camera. Further, image acquisition devices employing LIDAR and radar functionalities may also be conceivable.

The camera 200 is continuously monitoring the scene 1 by capturing image frames forming a video stream of the scene 1. The scene 1 that is within the field of view of the camera 200 is here exemplified as including the objects 104a-b and people 106a-c. The camera 200 may transmit the video stream over a communication link 112 connected to a communication network 114 having a transmission capacity, i.e., a bandwidth, to a client 116 or a server 118 where video stream may be stored and/or observed by a user as a live stream.

The camera 200 further comprises an image capturing module 202, an image processing pipeline 204, an encoder 206, a memory storage device 208, and an input and output interface 210 configured as a communication interface between the camera 200 and the communication network 114 via the communication link 112.

The image capturing module 202 comprises various components such as a lens and an image sensor, where the lens is adapted to project an image onto the image sensor comprising multiple pixels.

The image processing pipeline 204 is configured to perform a range of various operations on image frames received from the image sensor. Such operations may include filtering, demosaicing, color correction, noise filtering for eliminating spatial and/or temporal noise, distortion correction for eliminating effects of e.g., barrel distortion, global and/or local tone mapping, e.g., enabling imaging of scenes containing a wide range of intensities, transformation, e.g., rotation, flat-field correction, e.g., for removal of the effects of vignetting, application of overlays, e.g., privacy masks, explanatory text, etc. However, it should be noted that some of these operations, e.g., transformation operations, such as correction of barrel distortion, rotation, etc., may be performed by one or more modules, components or circuits arranged outside the image processing pipeline 204, for example in one or more units between the image processing pipeline 204 and the encoder 206.

Following the image processing pipeline 204, the image frames are forwarded to the encoder 206, in which the image frames are encoded according to an encoding protocol and forwarded to a receiver, e.g., the client 116 and/or the server 118, over the communication network 114 using the input/output interface 210. It should be noted that the camera 200 illustrated in FIG. 1 also includes numerous other components, such as processors, additional memories, etc., which are common in conventional camera systems and whose purpose and operations are well known to those having ordinary skill in the art. Such components have been omitted from the illustration and description of FIG. 1 for clarity reasons.

The camera 200 also comprise a memory storage device 208 for storing encoded video streams. The memory storage device 208 may be a non-volatile memory, such as an SD card.

There are a number of conventional video encoding formats. Some common video encoding formats that work with the various embodiments of the present invention include: JPEG, Motion JPEG (MJPEG), High Efficiency Video Coding (HEVC), also known as H.265 and MPEG-H Part 2; Advanced Video Coding (AVC), also known as H.264 and MPEG-4 Part 10; Versatile Video Coding (VVC), also known as H.266, MPEG-I Part 3 and Future Video Coding (FVC); VP9, VP10 and AOMedia Video 1 (AV1), just to give some examples.

The image processing pipeline 204 and the encoder 206 may be operative on a control unit 212. The camera 200 preferably comprises the control unit 212 and are provided as a single unit with a common housing. However, it is envisaged that the control unit 212 may be a separate stand-alone control.

When monitoring the scene 1, the camera 200 continuously captures image frames that jointly form a video stream using the image capturing module 202, optionally processes the image frames in the image processing pipeline 204, encodes the processed data in encoder 206, and either stores the encoded image frames in the memory storage device 208 and/or directly transmits the encoded image frames over the communication network 114 depending on the presently available bandwidth in the communication network 114

However, if the connection to the communication network 114 is lost or reduced so that the bandwidth of the connection is insufficient for transmitting a video stream no video stream will be transmitted. The encoded video stream may be stored on the memory storage device 208, but this storage may fill up quickly.

To alleviate this problem, the inventors propose a method where multiple parallel video streams are generated and stored in parallel at different bitrates once the connection is lost or is insufficient for transmission. The video streams are consecutively discarded one by one as the memory storage device 208 fills up while the remaining video streams are continued. In this way, video streams may be ensured for the time during of the lost or insufficient connection with the trade-of and gradual decrease of video quality over time, instead of no video at all if the connection outage lasts beyond a certain time. Embodiments of the invention will now be described in more detail with reference to the drawings.

Figure 2:
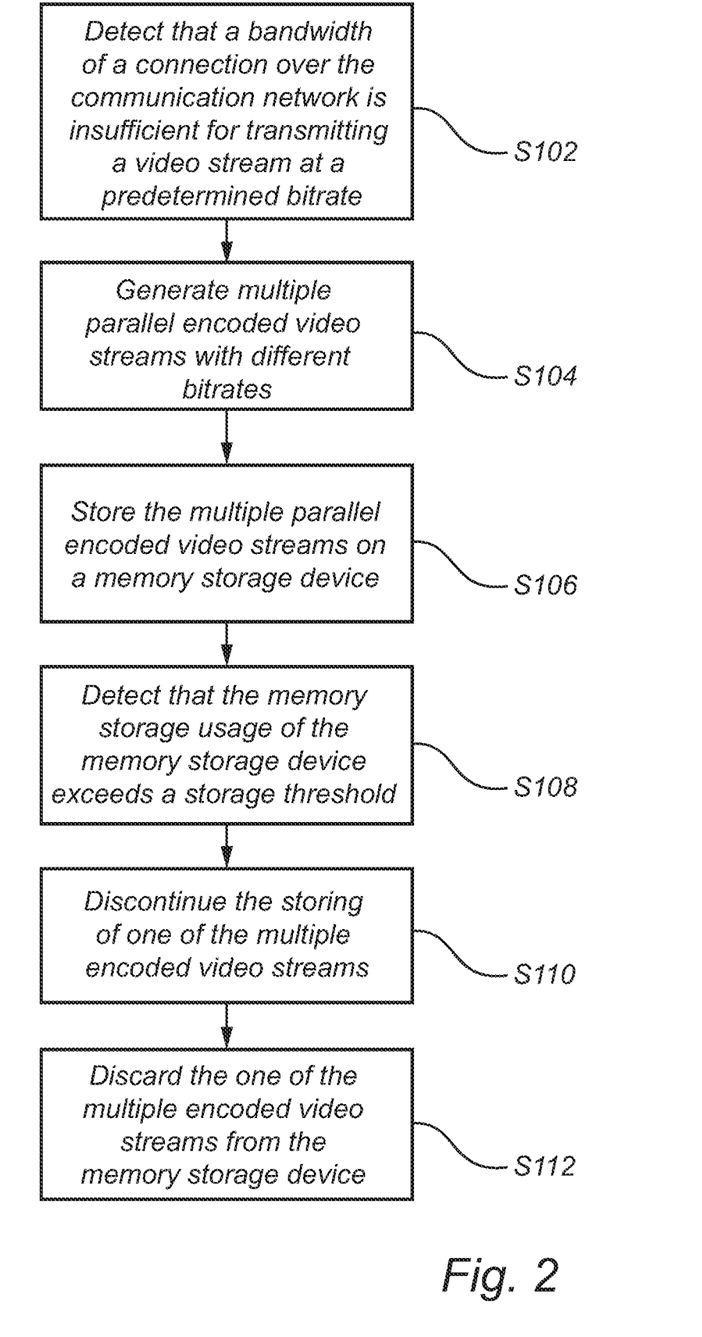
FIG. 2 is a flow-chart of method steps according to embodiments of the invention.
Figure 6:
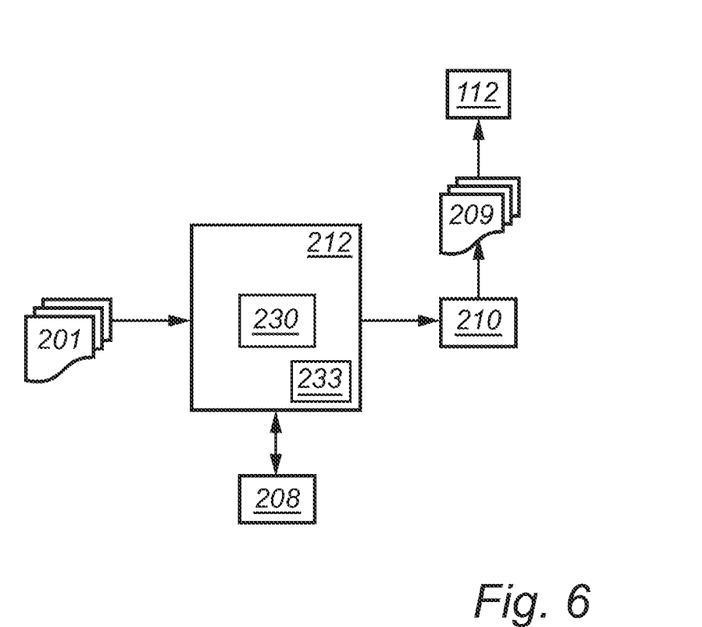
FIG. 6 is block-diagram of a control unit and data flow according to embodiments of the invention.

FIG. 2 is a flow-chart of method steps according to embodiments of the invention and FIG. 6 is a block diagram of a control unit 212 and components thereof.

It is herein provided a method of failover recording of video streams in a camera 200 connectable to a receiver device 116, 118 over a communication network 114. The control unit 212 receives image data 201 in the form of a stream of images from the image capturing module 202.

In step S102, the control unit 212 detects that a bandwidth of a connection over the communication network 114 is insufficient for transmitting a video stream at a predetermined bitrate. This may include to detect that the present bandwidth of the communication network 114 is below or equal to a predetermined threshold in terms of transmission bitrate, i.e., expressed as bits per second. The control unit 212 may detect that the bandwidth is insufficient by attempting to transmit data over the communication network 114 using the input/output interface 210.

In step S104, the control unit 212 generates multiple parallel encoded video streams with different bitrates. The control unit 212 employs the encoder 206 for generating the parallel encoded video streams. That the video streams are parallel means that they capture the same scene for the same time duration. Thus, apart from their bitrates being different, the video streams include the same image scene representation.

In step S106, the control unit 212, stores the multiple parallel encoded video streams on the memory storage device 208 accessible to the camera 200. The image frames of the encoded video streams are stored as they are generated. Thus, once an image frame has been encoded with a set of different bitrates, the encoded image frames are stored on the memory storage device 208. The video streams may be complete video streams or in some embodiments may refer to a base encoded video stream with associated enhanced encoded video streams according to scalable video formats such as high efficiency video encoding sometimes known as H.265.

In step S108, the control unit 212 detects that the memory storage usage of the memory storage device 208 exceeds a storage threshold. In other words, the amount of data stored on the memory storage device 208 exceeds a storage threshold. The threshold may indicate that the memory storage device 208 is nearly full, or that the memory storage device 208 is full, and has no more capacity to store additional data of the encoded video streams.

In step S110, the control unit 212, controls a discontinuing of the storing of one of the multiple encoded video streams. Discontinuing storing of a video stream means that the encoding of the image frames at the respective bitrate is no longer performed or that once encoding has been performed the resulting encoded image frames are immediately discarded.

The discontinued encoded video stream is the encoded video stream that provides the highest bitrate among the multiple encoded video streams. As will be described in more detail below, the discontinued encoded video stream may be of different formats depending on the encoding scheme but is generally the encoded video stream for which a bitrate of the final viewable video is the highest, thus discontinuing storing one of the multiple encoded video streams sacrifices the highest bitrate video stream. Generally, the bitrate depends on at least resolution, degree of video compression, and frame rate, thus one of these are typically sacrificed to the benefit of releasing capacity on the memory storage device 208. The multiple parallel encoded video streams may by encoded with different image resolutions and/or frame rates.

In step S112, the control unit 212 controls a discarding of the one of the multiple encoded video streams that was discontinued for storing from the memory storage device 208.

Figure 3:
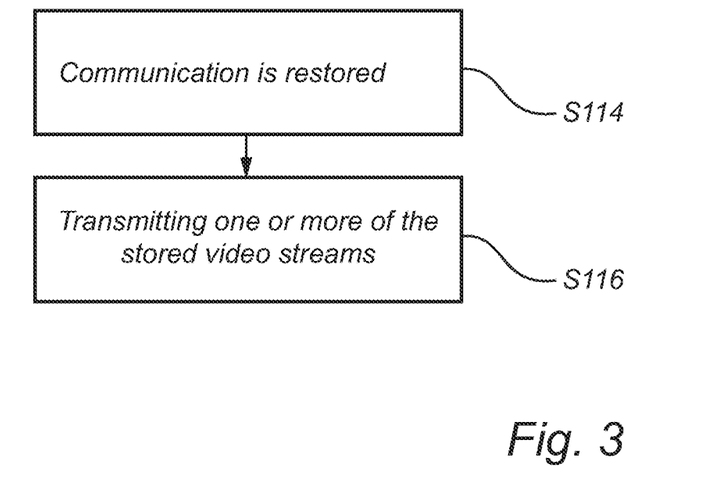
FIG. 3 is a flow-chart of method steps according to embodiments of the invention.

Turning to the flow-chart in FIG. 3 in conjunction with FIG. 6, if during to time of reduced or lost connectivity over the communication network 114, the control unit 212 detects, or in some way receives information or a message of that the communication across the communication network 114 is restored, in step S114, then the control unit is configured to transmit, in step S116, over the communication network 114, one or more of the multiple parallel encoded video streams 209. Detecting that the communication network is restored may include to determine that the bandwidth of the connection across the communication network 114 exceeds some predetermined threshold indicative of stable connectivity.

Furthermore, the control unit 212 may determine a present bandwidth of the restored communication network 114 by attempting to transmit data. In other words, the control unit 212 may at some interval attempt to transmit the presently highest bitrate video stream to evaluate if the present bandwidth is sufficient for transmission. The interval, determined by an incremental backoff timer, may be for example to attempt transmitting data every 1, 2, 4, 8, 16, 32, 60, 60, 60 . . . seconds. Based on this initial evaluation, the control unit 212 may select and transmit one or more of the still stored encoded video streams that combined does exceed the present bandwidth of the restored communication network 114, so that the one or more of the still stored encoded video streams can be transmitted across the communication network 114.

Figure 4:
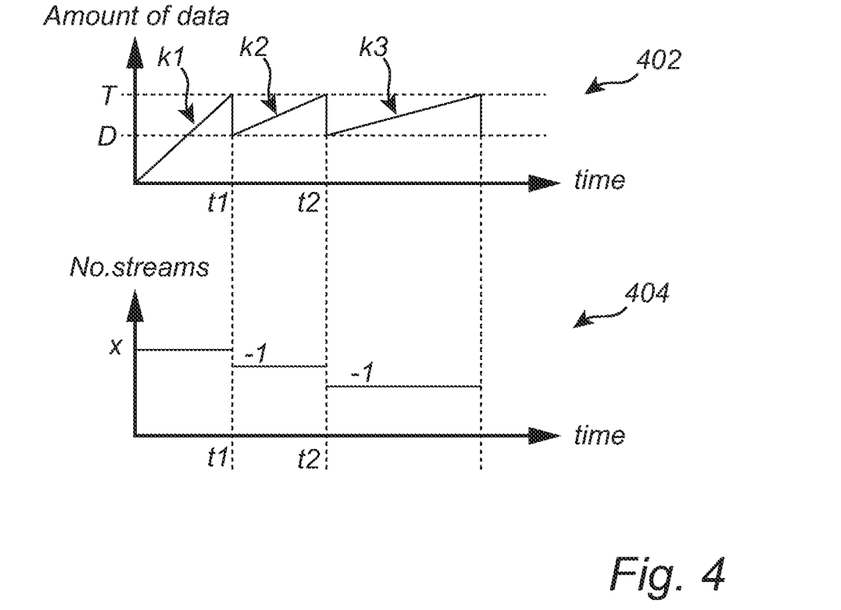
FIG. 4 illustrate two graphs of time evolution of amount of stored data and number of video streams according to embodiments of the invention.

Now turning to FIG. 4 which includes a first graph 402 of the amount of data from the encoded parallel video streams as a function of time, and a second graph 404 that illustrates the corresponding decrease in the number of stored encoded video streams.

When all the parallel encoded video streams are initially stored, here represented by X number of streams, the amount of stored data increases until it reaches the threshold T. As discussed above, the threshold T may indicate that the memory storage device 208 is close to being full, that the memory storage device 208 has reached its full capacity. As this occurs, at time t1, one of the encoded video streams is discarded from the memory storage device 208, thus the number of video streams is reduced by 1 as indicated in the second graph 404 and the amount of data is reduced to level D.

The remaining video streams are continued for storing until the memory storage device 208 again has reached to or near its full capacity at time t2, whereby a second encoded video stream with a bitrate different from the first encoded video stream discarded at time t1 is discarded and the number of stored video streams is again reduced by one and the amount of stored data drops to level D.

The above is repeated, thus the remaining video streams are continued for storing until the memory storage device 208 again has reached to or near its full capacity at time t3, whereby a third encoded video stream with a bitrate different from the other encoded video streams is discarded at time t3. The number of stored video streams is again reduced by one and the amount of stored data drops to level D. This is repeated until the communication network 114 is restored, or until no more encoded video streams remain on the memory storage device 208.

As indicated in the graph 402, the slopes k1, k2, k3, decrease as the number of encoded video streams decrease. In this embodiment, the multiple parallel encoded video streams are generated with decreasing inter-stream bitrates. Further, it is preferred to discontinue the storing the presently highest bitrate video stream, and to discard the presently highest bitrate video stream. In other words, the first encoded video stream that is discarded was encoded with the highest bitrate, the second encoded video stream that is discarded was encoded with the second highest bitrate, the third encoded video stream that is discarded was encoded with the third highest bitrate, and so on. Thus, relatively higher bitrate video streams are discarded before relatively lower bitrate video streams. With a lower bitrate it takes longer time to generate the same amount of data as with a higher bitrate.

The number of parallel video streams is here in the graphs 402 and 404 exemplified as three. Preferably the number of parallel encoded video streams is at least two, such as 3, 4, 5, 6, 7, 8, 9, or 10 parallel encoded video streams.

In one embodiment, the decrease in bitrate is a scaling by half between the parallel video streams. In this way, when the memory storage device 208 is full, the encoded video stream with highest bitrate will occupy 50% of the memory storage device 208 capacity while all the other video streams together occupy the remaining 50%. The first encoded video stream is discarded, and the remaining encoded video stream can use the freed space on the memory storage 208. With this embodiment, the amount of data D is 50% of the threshold T. To schematically illustrate this embodiment, the encoding may be for six video streams:

Stream 1: With full bitrate.
Stream 2: With half bitrate.
Stream 3: With quarter bitrate.
Stream 4: With ⅛ bitrate.
Stream 5: With 1/16 bitrate.
Stream 6: With 1/32 bitrate.

However, six video streams is means as an example to illustrate the present embodiment. Any multiple number of the above, or streams with further scaled bitstreams. Compared to saving only the full bitrate stream, the capacity of the memory storage device needs to have twice the capacity of storing the full bitrate stream. However, with the above scaling, the amount of additional space will never be more that this even for infinity number of streams since the since the total memory can be expressed as a geometric sum, $½+¼+⅛$, etc.

Figure 5:
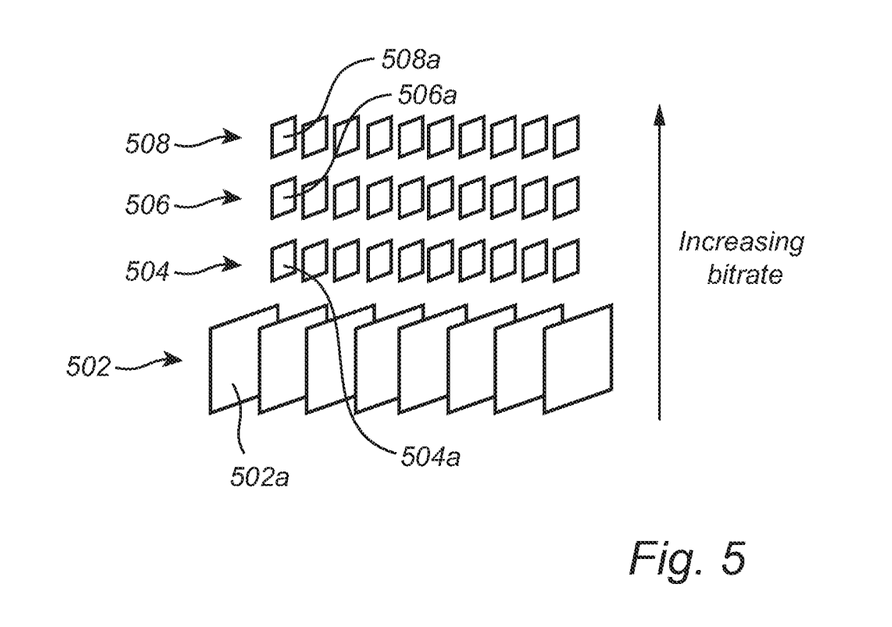
FIG. 5 schematically illustrates scalable video.

FIG. 5 schematically illustrates a base encoded video stream 502 comprising a set of image frames 502a of which only one is denoted. The base encoded video stream 502 is encoded with a relatively low resolution. To achieve a higher resolution, the base encoded video stream 502 is interleaved or combined with one or more enhancement encoded video streams 504, 506, 508 comprising frames 504a, 506a, 508a of which only one frame per enhancement encoded video stream is denoted. Here, three enhancement encoded video streams are shown as an example, but the invention is equally applicable with only two or even one enhancement encoded video stream, or with more than three enhancement encoded video streams.

The enhancement encoded video streams, often called enhancement layers, include information for increasing the quality of the base encoded video stream. Such information may for example be data to increase resolution or frame rate.

Which enhancement encoded video streams 504, 506, 508 are combined or interleaved with the base encoded video stream 502 depends on the desired resolution of the final encoded video stream. Generally, first image frames of the base encoded video stream 502 are decoded, and then the image frames of the enhancement encoded video stream 504 are decoded and added to the decoded base video stream images. More specifically, a base frame 502a is decoded and is scaled up in resolution. The scaled up base frame 502a is used as a reference for one or more enhancement encoded image frames 504a, 506a, 508a. Thus, to take full advantage and provide improved image quality of the scaled up base frame 502a, the contents of one or more enhancement encoded image frames 504a, 506a, 508a are added to the scaled up base frame 502a.

The higher video quality is required, more enhancement encoded video streams 504, 506, 508 need to be combined or interleaved with the base encoded video stream 502. Consequently, the bitrate of the resulting video stream increases with the number of enhancement encoded video streams, 504-508, that are combined with the based encoded video stream 502.

If the resolution provided by the second enhancement encoded video stream 508 is desired, then the first enhancement encoded video stream 504, the second enhancement encoded video stream 506, and the third enhancement encoded video stream 508 may all be combined with the base encoded video stream 502. Generally, the enhancement encoded video stream only contain the addition or difference to enhance for example frame rate or resolution and are not viewable in their own without the base encoded video stream 502.

In view of the discussion of FIG. 5 and a further embodiment of the invention, the multiple parallel encoded video streams may comprise a base encoded video stream 502 and a set of enhancement encoded video streams 504, 506, 508 combinable with the base encoded video stream 502 to form a higher quality video stream than the base encoded video stream 502 alone. In this embodiment, discontinuing the storing is to discontinue the storing of one or more of the enhancement encoded video streams 504, 506, 508. Further, it is one or more of the enhancement encoded video streams 504, 506, 508 that is discarded.

The enhancement encoded video stream 508 that together with the base encoded vides stream 502 and any intermediate enhancement encoded video stream 504, 506 would result in the highest combined bitrate is the one that is discarded. Thus, in this example, the enhancement encoded video stream 508 would be discontinued and discarded first when the memory storage device 208 is full. Next time the memory storage device 208 is full, the enhancement encoded video stream 506 is discontinued and discarded. Here the total number of parallel video streams 502, 504, 506, 508 is four. However, further enhancement video streams are envisaged, such as 3 or 4 enhancement encoded video streams.

FIG. 6 is a block diagram of a control unit 212 and data flow according to embodiments of the invention.

A computer program 233 comprising instructions which, when the program is executed by the control unit 212, cause the control unit 212 to carry out the method of any one of the methods described herein. The control unit 212 includes processing circuitry 230 that is arranged to perform the steps of the herein disclosed methods.

The control unit receives image data 201 in the form of a stream of images from an image capturing module, 202, e.g., 202 shown in FIG. 1. Normally, the encoded video stream is transmitted over a communication network via an input/output interface 210 connected to a communication link 112 that provides access to the communication network 114.

When the control unit 212 detects that a bandwidth of a connection over the communication network is insufficient for transmitting a video stream, the control unit 212 initiates generation of multiple parallel encoded video streams, e.g., n parallel encoded video streams, with different bitrates that are stored on the memory storage device 208 that is accessible to the control unit 212.

As more image frames of the video streams are stored on the memory storage device 208, the control unit 212 may detect that the memory storage usage of the memory storage device 208 exceeds a storage threshold. When this occurs, the control unit 212 discontinues of the storing of one of the multiple encoded video streams and continues the storing of the remaining n−1 parallel encoded video streams. Subsequently, the control unit 212 discards the discontinued video stream from the memory storage device 208 which now stores only n−1 video streams.

Once a connection over the communication network is restored, the control unit 212 transmits, using the input/output interface and the communication link 112, one or more of the multiple parallel encoded video streams 209.

The control unit includes a microprocessor, microcontrol unit, programmable digital signal processor or another programmable device. The control unit may also, or instead, include an application specific integrated circuit, a programmable gate array or programmable array logic, a programmable logic device, or a digital signal processor. Where the control unit includes a programmable device such as the microprocessor, microcontrol unit or programmable digital signal processor mentioned above, the processor may further include computer executable code that controls operation of the programmable device.

The control functionality of the present disclosure may be implemented using existing computer processors, or by a special purpose computer processor for an appropriate system, incorporated for this or another purpose, or by a hardwire system. Embodiments within the scope of the present disclosure include program products comprising machine-readable medium for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general-purpose computer, special purpose computer, or special purpose processing machines to perform a certain function or group of functions.

Although the figures may show a sequence the order of the steps may differ from what is depicted. Also, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps. Additionally, even though the invention has been described with reference to specific exemplifying embodiments thereof, many different alterations, modifications and the like will become apparent for those skilled in the art.

In addition, variations to the disclosed embodiments can be understood and effected by the skilled addressee in practicing the claimed invention, from a study of the drawings, the disclosure, and the appended claims. Furthermore, in the claims, the word "comprising" does not exclude other elements or steps, and the indefinite article "a" or "an" does not exclude a plurality.

The invention claimed is:

1. A method of failover recording of video streams in a camera connectable to a receiver device over a communication network, the method comprising:
   detecting that a connection to the communication network is lost or reduced so that present capacity of a bandwidth of the connection over the communication network is less than a bitrate of a presently produced encoded video stream,
   in response to the lost or reduced connection, generating multiple parallel encoded video streams with decreasing bitrates being a scaling of the bitrates,
   storing the multiple parallel encoded video streams on a memory storage device accessible to the camera,
   detecting that the amount of data stored on the memory storage device exceeds a storage threshold,
   when the amount of data exceeds the storage threshold, discontinuing the storing of one of the multiple encoded video streams being the encoded video stream that provides the highest bitrate among the multiple encoded video streams, and
   discarding the one of the multiple encoded video streams from the memory storage device; the method further comprising:
   detecting that the communication network is restored, and
   transmitting, over the communication network, one or more of the stored multiple parallel encoded video streams.

2. The method according to claim 1, comprising:
   determining a present bandwidth of the restored communication network, and
   transmitting one or more of the still stored bitrate video streams that combined does not exceed the present bandwidth of the restored communication network.

3. The method according to claim 1, wherein the decrease in bitrate is a scaling by half between the parallel video streams.

4. The method according to claim 1, wherein discontinuing the storing is to discontinue the storing the presently highest bitrate video stream, and wherein the presently highest bitrate video stream is discarded.

5. The method according to claim 1, wherein the multiple parallel encoded video streams are encoded with different image resolutions and/or frame rates.

6. The method according to claim 1, wherein the storage threshold is that the memory storage device is full.

7. The method according to claim 1, wherein the number of parallel video streams is at least two.

8. A camera comprising a memory storage for storing encoded video streams, an input/output interface to communicate with a receiver device over a communication network, and a control unit, for implementing a method for failover recording of video streams in the camera, the method comprising:
   detecting that a connection to the communication network is lost or reduced so that present capacity of a bandwidth of the connection over the communication network is less than a bitrate of a presently produced encoded video stream,
   in response to the lost or reduced connection, generating multiple parallel encoded video streams with decreasing bitrates being a scaling of the bitrates,
   storing the multiple parallel encoded video streams in the memory storage,
   detecting that the amount of data stored on the memory storage exceeds a storage threshold,
   when the amount of data exceeds the memory storage threshold, discontinuing the storing of one of the multiple encoded video streams being the encoded video stream that provides the highest bitrate among the multiple encoded video streams, and
   discarding the one of the multiple encoded video streams from the memory storage; the method further comprising:
   detecting that the communication network is restored, and
   transmitting, over the communication network, one or more of the stored multiple parallel encoded video streams.

9. A non-transitory computer readable recording medium comprising a computer program product comprising program code for performing, when executed by a control unit, method for failover recording of video streams in a camera connectable to a receiver device over a communication network, the method comprising:
   detecting that a connection to the communication network is lost or reduced so that present capacity of a bandwidth of the connection over the communication network is less than a bitrate of a presently produced encoded video stream, in response to the lost or reduced connection, generating multiple parallel encoded video streams with decreasing bitrates being a scaling of the bitrates, storing the multiple parallel encoded video streams on a memory storage device accessible to the camera, detecting that the amount of data stored on the memory storage device exceeds a storage threshold, when the amount of data exceeds the storage threshold, discontinuing the storing of one of the multiple encoded video streams being the encoded video stream that provides the highest bitrate among the multiple encoded video streams, and discarding the one of the multiple encoded video streams from the memory storage device; the method further comprising:

detecting that the communication network is restored, and
transmitting, over the communication network, one or more of the stored multiple parallel encoded video streams.

* * * * *